United States Patent [19]

Snowden et al.

[11] 4,156,522
[45] May 29, 1979

[54] JOINTING MEMBERS OF BUILDING STRUCTURES

[75] Inventors: Gerald L. Snowden, Glen Iris; Robert N. Wilson, Surrey Hills, both of Australia

[73] Assignee: Syzygy Pty. Ltd., Camberwell, Australia

[21] Appl. No.: 853,521

[22] Filed: Nov. 21, 1977

[30] Foreign Application Priority Data

Nov. 22, 1976 [AU] Australia .............................. 8210/76

[51] Int. Cl.² ........................ E04F 11/18; E04F 17/14
[52] U.S. Cl. ....................................... 256/67; 403/201
[58] Field of Search ....................... 256/21, 22, 24, 59, 256/65, 60, 66, 68; 52/300, 301, 716, 465, 466, 467, 468; 248/219.2; 403/242, 245, 246, 263, 230, 201

[56] References Cited

U.S. PATENT DOCUMENTS

| 3,351,324 | 11/1967 | Blum et al. | 256/68 |
|---|---|---|---|
| 4,050,828 | 9/1977 | Noro | 256/22 |

*Primary Examiner*—Werner H. Schroeder
*Attorney, Agent, or Firm*—Finnegan, Henderson, Farabow & Garrett

[57] ABSTRACT

There is disclosed herein a capital for use in joining a rail to an upright column in a building structure, such as a balustrading system, which capital includes a lower portion having a passage therein to receive in press-fitting engagement the upper end of the column, and an upper portion on opposite sides of which protrusions are provided which are engaged on their undersides by opposed inwardly directed flanges of the rail. The protrusions taper inwardly and upwardly such that the rail can be forced over the protrusions with the flanges being temporarily flexed outwardly to thereafter engage beneath the protrusions. The undersides of the protrusions are curved to allow the rail to adopt any desired angular orientation with respect to the column, while the protrusions are also tapered towards the sides of the capital to allow for some limited adjustment in the horizontal plane. A bracket member is also disclosed for connecting a rail to an associated structure such as the wall of a building or another hand rail, and have a central portion and two end portions which are also provided with protrusions of the type described above in relation to the capital, while provision is made for attaching the bracket member to the associated structure.

13 Claims, 10 Drawing Figures

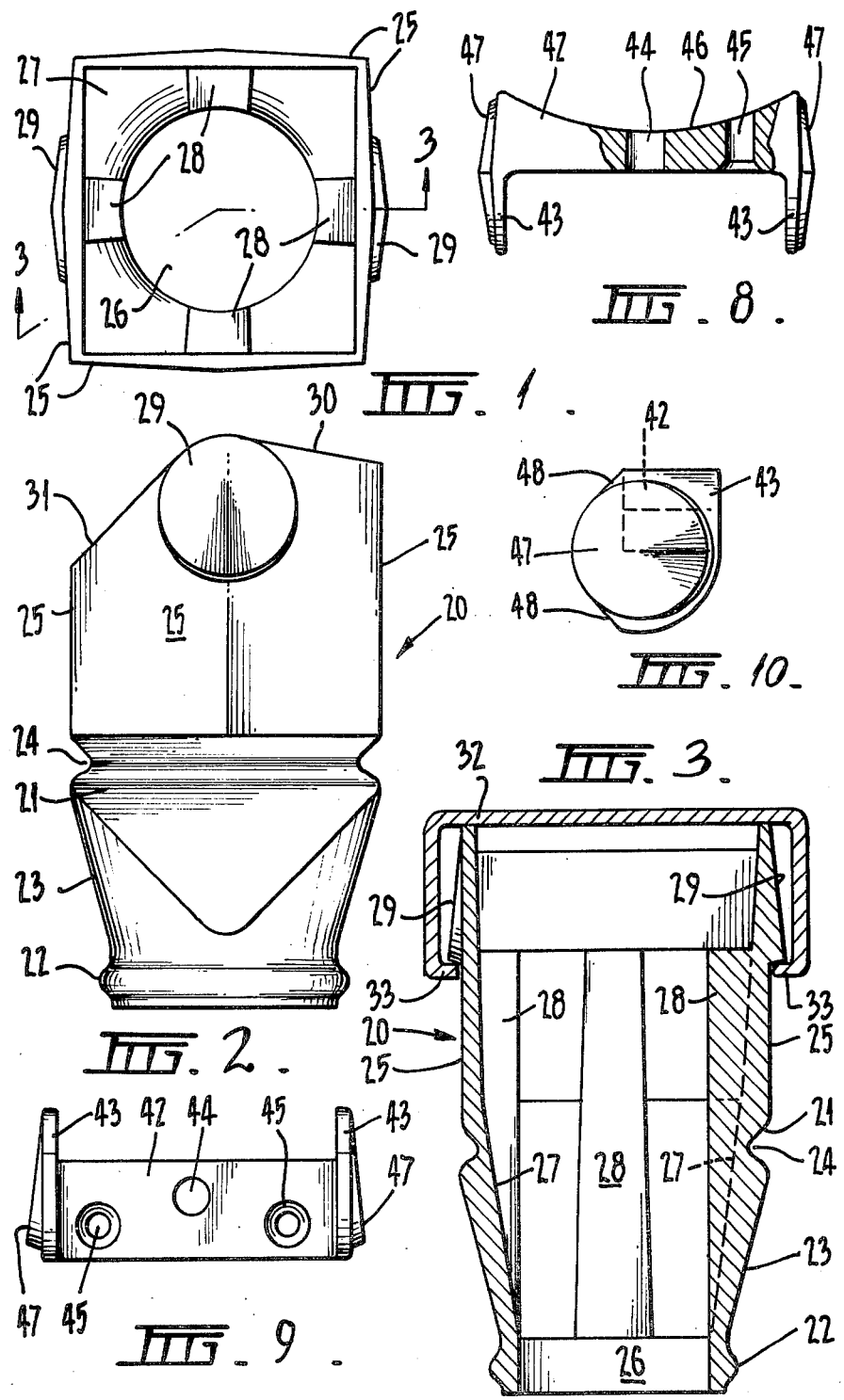

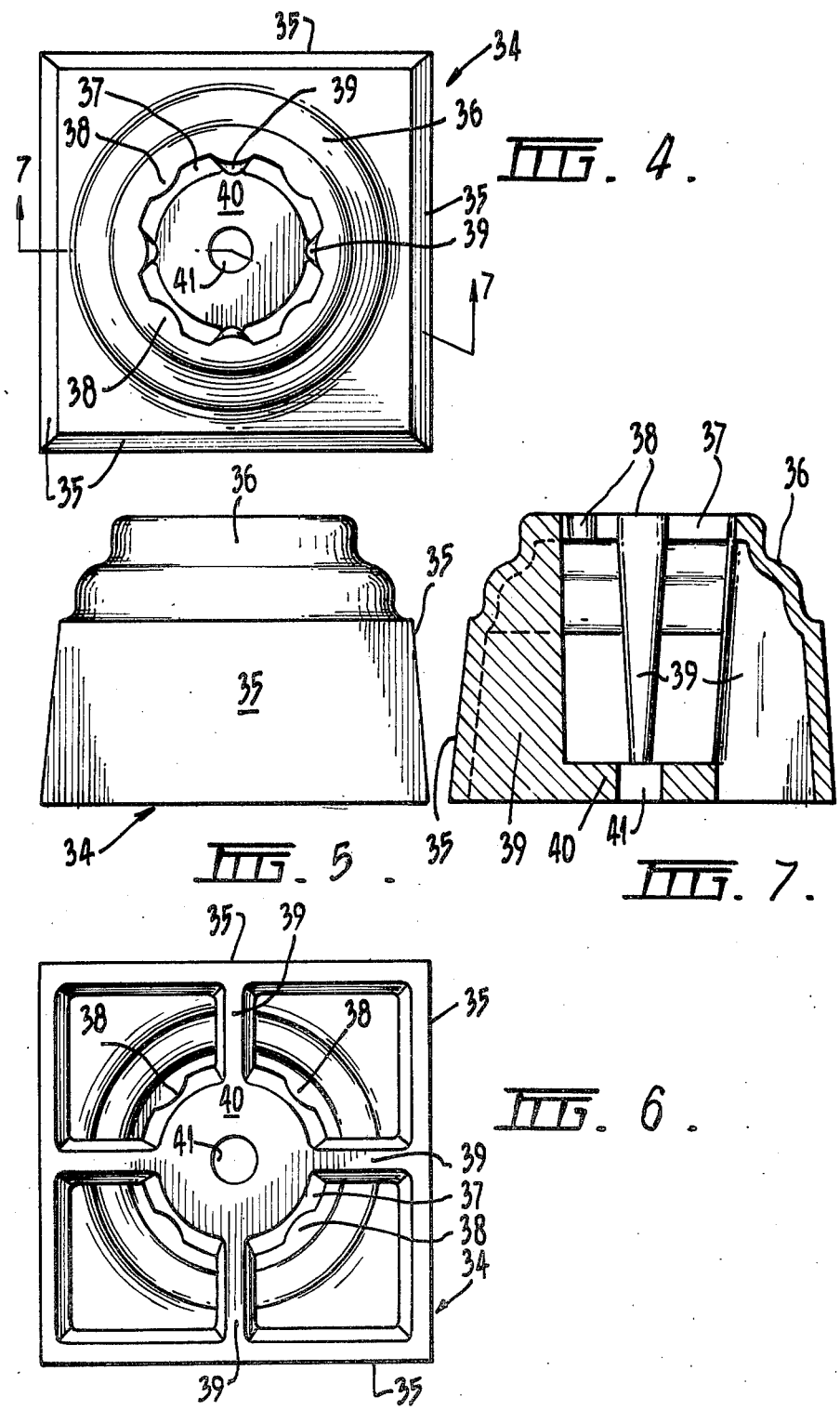

JOINTING MEMBERS OF BUILDING STRUCTURES

This invention relates to the connection of the upright building columns to the rails, and more particularly, but not exclusively, to connecting the upright columns to the top hand railing in a system of balustrading, and/or to the connection of the top hand railing to an adjacent fixed structure or a further adjacent hand rail section.

The invention relates particularly, but not exclusively to connections formed from components made from aluminium.

It is a basic objective of the invention to provide a joining technique between upright columns and railings and/or between the rail and an adjacent fixed structure or a further adjacent rail section, in a building structure, including balustrading systems, which will enable relatively easy assembly of the components on-site.

According to one aspect of the invention there is envisaged a capital for, in use, facilitating jointing between the upper end of a column and a rail in a building structure, said capital including a lower portion having a passage therein adapted, in use, to receive the upper end of said column, and a upper portion having on at least one pair of opposed sides thereof a pair of protrusions adapted, in use, to receive on the undersides thereof opposed inwardly directed flanges of an associated rail which is received over the upper portion of the capital.

Preferably the building structure is a balustrading system in which the rail is a hand rail, and the undersides of the opposed protrusions are curved to, in use, allow the upper rail to extend substantially at right angles to the associated column when the balustrading is extending along substantially horizontal surfaces or to allow adjustment of the orientation of the upper rail to extend at an acute angle with respect to the column when the balustrading extends up substantially inclined ramps or steps.

According to this first aspect of the invention there is envisaged a building structure, for example a balustrading system, incorporating at least one capital as defined above in combination with at least one column and at least one rail having a pair of inwardly directed flanges.

According to a second aspect of the invention there is envisaged a bracket member adapted, in use, to facilitate connection between a hand or similar rail and an associated structure, said bracket member including a central body portion and a pair of end portions, each end portion carrying a protrusion adapted, in use, to receive on the underside thereof one of a pair of opposed inwardly directed flanges of the associated rail, said bracket member further including provision to attach said member to said associated structure. The associated structure may be a column or a fixed structure such as a wall, or another hand or similar rail in which the bracket member enables connection at a required angular orientation in the vertical and/or horizontal planes.

An embodiment of each aspect of the invention will now be described with reference to the accompanying drawings in which:

FIG. 1 is a plan view of the capital according to the first aspect of this invention, FIG. 2 is a side elevational view of the capital as viewed from the left in FIG. 1, FIG. 3 is a cross-sectional side elevational view taken along line 3—3 of FIG. 1, FIG. 4 is a plan view of a base member for the column with which the capital of FIGS. 1 to 3 is utilised, FIG. 5 is a side elevational view of the base member of FIG. 4, FIG. 6 is a view from beneath of the base member of FIGS. 4 and 5, FIG. 7 is a cross-sectional side elevational view taken along line 7—7 of FIG. 4, FIG. 8 is a plan view partly in section of the bracket member according to the second aspect of the invention, FIG. 9 is a side elevational view of the bracket member of FIG. 8, and FIG. 10 is an end elevational view of the bracket member of FIGS. 8 and 9.

Referring to FIGS. 1 to 3 of the drawings, the capital according to this preferred form of the first aspect of the invention is cast from aluminium and comprises a generally elongate hollow body 20, the lower portion 21 of which is formed in a decorative manner with a circumferentially extending rib 22 and outwardly and upwardly tapering surface 23, a notch 24 which finally merges into four flat outer surfaces 25 forming a substantially square-shaped cross-section. The lower end of the body has a circular opening 26 therethrough which merges into an outwardly and upwardly tapering inner surface 27 also merging into inner surfaces forming an internal square-shape cross-section towards the top of the body.

The interior of the lower portion 21 of the body has two pairs of opposed ribs 28 formed therein which taper slightly inwardly and upwardly from a maximum distance apart adjacent the opening 26 to a minimum distance apart towards the top of the body. The tapering internal ribs 28 allow the upper end of a tubular column when inserted through the opening 26 to be held in position by forcing it upwardly in a press-fitted or jammed position between the opposed pairs of ribs 28.

A pair of protrusions 29 are provided on the exteriors of one pair of the opposed surfaces 25 and are generally circular in shape as shown in FIG. 3, and each taper outwardly from a point merging with the respective surface 25 near the top of the body. As shown in FIG. 1, the protrusions 29 also taper from a high mid point to lower points towards either side of the body as shown. As shown in FIG. 2 the upper edges of the body are slightly downwardly inclined (approximately 10°) at 30 towards one side of the body and are more sharply downwardly inclined (approximately 45°) at 31 to the other side of the body.

The capital described above is adapted to connect the column which is jammed within its lower portion to a hand rail in a balustrading system. The hand rail shown in FIG. 3 takes the form of an elongate generally C-shaped cross-sectional member 32 completed by two inwardly directed and facing flanges 33. The inwardly facing edges of the flanges 33 are spaced apart a distance approximately equal to the width of the top of the body of the capital, and the rail may be joined to the capital by forcing it downwardly over the top of the capital with the side webs and flanges 33 of the rail flexing momentarily outwardly as they pass over the protrusions 29 and thereafter return to the unstressed condition with the flanges 33 interlocked beneath the protrusions 29 as shown in FIG. 3. Referring particularly to FIG. 2, the provision of the curved undersides of the protrusions 29 and the upper inclined edges 31 allow the orientation of the rail to be adjusted from a conventional horizontal position for balustrading along horizontal surfaces to a downwardly inclined orientation up to 45°, whilst the slight inclination up to 10° is allowed due to the inclination of the edges 30. The sideways directed inclined surfaces on the protrusions as shown in FIG. 1 also allow for some degree of adjustment of orientation in the horizontal plane.

A less practical alternative to press-fitting the rail over the protrusions 29 may involve the rail and the capital being brought together with the surfaces of the capital not carrying the protrusions being inserted firstly, whereafter the capital or the rail is swung through 90° to bring the flanges 33 into an interlocking position beneath the protrusions 29. In such a situation notches would need to be formed across the corners of the body in the path of the flanges 33 to allow passage of the flanges around the corners of the body and into the interlocked position.

Referring to FIGS. 4 to 7 of the drawings, the base member for the column with which the capital of FIGS. 1 to 3 is utilised is also cast from aluminium and comprises a hollow body 34 having a square cross-sectional shaped base with four generally upwardly and slightly inwardly tapering walls 35 completed by an upper portion 36 of circular cross-section and decoratively shaped as shown. The upper portion of the body 34 has a generally circular hole 37 therethrough with a slightly inwardly and downwardly tapering edge as shown in FIG. 7. The base member is adapted to cooperate with a column having a plurality of axially extending grooves in its surface for decorative purposes, and as such, the edge of the hole 37 in the base member is formed with a plurality of mating ribs 38. Four internal webs or ribs 39 are provided within the body of the member, the inner edges of which are slightly tapered downwardly and inwardly such that when the lower end of a column is forced into the hole 37 it will be press-fitted or jammed between the opposed pairs of tapering webs or ribs 39. As shown the webs or ribs 39 at the lower ends thereof terminate at the circumference of a circular disc portion 40, and a hole 41 is provided through the disc portion 40 and may be used to locate the base member on a locating pin on the supporting surface during installation of the balustrading system.

Referring to FIGS. 8 to 10 of the drawings, the bracket member according to this preferred form of the second aspect of the invention is also cast from aluminium and comprises a central body portion 42 and two end portions 43. The central body portion has a central hole 44 therethrough for allowing attachment of the bracket member to an adjacent fixed structure, such as a wall, by a screw or bolt connection, and a pair of counter sunk holes 45 to allow connection of the bracket to the side of a column by self-tapping screws or the like. One face 46 of the central portion is curved as shown to match the curvature of an associated column to which it is to be attached in one application of the invention.

The end portions 43 carry protrusions 47 similar to those shown as 29 in the embodiment of FIGS. 1 to 3, and no further description is required, whilst the flanges of a hand rail similar to that shown in FIG. 3 interlock with the protrusions 43 in a similar manner.

As shown in FIG. 10, the end portions 43 are provided with inclined edges 48 which merge with the circular shape of the protrusions 47 to allow adjustment of the orientation of the hand rail through 45° on either side of the horizontal, whilst the sideway directed tapers shown in FIG. 8 allow for some slight adjustment of the angular orientation of the hand rail in the horizontal plane.

The bracket member may be attached directly to the side of a circular column substantially matching the curved face 46 by self-tapping screws and a hand rail attached to extend away from the column at any inclination up to 45° on either side of the horizontal and with a slight orientation in the horizontal plane if necessary. Alternatively the bracket member may be attached to a fixed structure, such as a wall, by virtue of a screw or bolt through the central hole 44 and the rail may also extend away from the wall at any inclination up to 45° on either side of the horizontal and with a slight orientation in the horizontal plane if necessary.

Furthermore, two hand rail sections may be joined end to end by fastening two of the bracket members together by a nut and bolt attachment through the aligned holes 44 thereof, and the end of each respective hand rail interlocked with one of the bracket members, and the rail sections on either side or both sides of the joint may extend away at any angular orientation within the 45° range on either side of the horizontal and with some slight angular orientation in the horizontal plane if necessary.

By interposing a suitable corner member with two of the bracket members according to this invention attached thereto, a pair of hand rail sections may be joined to form any required corner angle, such as 90° and up to complete reversals of the direction of the hand rail system in the opposite direction such as at conventional sub-landings for stairways.

We claim:

1. A capital for, in use, facilitating jointing between the upper end of a column and a rail in a building structure, said capital including a lower portion having a passage therein adapted, in use, to receive the upper end of said column, and an upper portion having on at least one pair of opposed sides thereof a pair of protrusions adapted, in use, to receive on the undersides thereof opposed inwardly directed flanges of an associated rail which is received over the upper portion of the capital and wherein the protrusions taper inwardly from a mid point towards either side thereof.

2. A capital according to claim 1, wherein the undersides of the protrusions are curved to, in use, allow the upper rail to extend substantially at right angles to the associated column when the structure extends along substantially horizontal surfaces, or to allow adjustment of the orientation of the upper rail to extend at an acute angle with respect to the column when the structure extends up substantially inclined surfaces.

3. A capital according to claim 1, wherein the protrusions taper inwardly and upwardly towards the top of the capital.

4. A capital for, in use, facilitating jointing between the upper end of a column and an upper hand rail in a balustrading system, said capital including a lower portion having a passage therein adapted, in use, to receive the upper end of said column, and an upper portion having on at least one pair of opposed sides thereof a pair of protrusions adapted, in use, to receive on the undersides thereof opposed inwardly directed flanges of an associated hand rail which is received over the upper portion of the capital and wherein the protrusions taper inwardly from a mid point towards either side thereof.

5. A capital as claimed in claim 4, wherein the undersides of the protrusions are curved to, in use, allow the upper hand rail to extend substantially at right angles to the associated column when the balustrading extends along substantially horizontal surfaces, or to allow adjustment of the orientation of the upper hand rail to extend at an acute angle with respect to the column when the balustrading extends up substantially inclined ramps or steps.

6. A capital according to claim 4, wherein the protrusions taper inwardly and upwardly towards the top of the capital.

7. A bracket member adapted, in use, to facilitate connection between a hand or similar rail and an associated structure, said bracket member including a central body portion and a pair of end portions, each end portion carrying a protrusion adapted, in use, to receive on the underside thereof one of a pair of opposed inwardly directed flanges of the associated rail, said bracket member further including provision to attach said member to said associated structure and wherein the protrusions taper inwardly from a mid point towards either side thereof.

8. A bracket member according to claim 7, wherein the undersides of the protrusions are curved to, in use, allow the rail to extend substantially at right angles to the associated structure, or to allow adjustment of the orientation of the rail to extend at an acute angle with respect to the associated structure.

9. A bracket member according to claim 7, wherein the protrusions taper inwardly and upwardly towards the top of the member.

10. A balustrading system incorporating at least one column, at least one upper hand rail having a pair of inwardly directed flanges and at least one capital, said capital including a lower portion having a passage therein to receive the upper end of said column, and an upper portion having on at least one pair of opposed sides thereof a pair of protrusions adapted to receive the inwardly directed flanges of said hand rail on the undersides thereof, whilst said hand rail is received over the upper portion of the capital, and wherein the undersides of the protrusions are curved to allow the upper hand rail to extend substantially at right angles to said column when the balustrading extends along substantially horizontal surfaces, or to allow adjustment of the orientation of the upper hand rail to extend at an acute angle with respect to the column when the balustrading extends up substantially inclined ramps or steps, and wherein the protrusions taper inwardly and upwardly towards the top of the capital and also taper inwardly from a mid point towards either side thereof.

11. A building structure incorporating a hand or similar rail, an associated structure and a bracket member, said bracket member including a central body portion and a pair of end portions, each end portion carrying a protrusion adapted to receive on the underside thereof one of a pair of opposed inwardly directed flanges of the associated rail, said bracket member further including provision to attach said member to said associated structure, and wherein the undersides of the protrusions are curved to allow the rail to extend substantially at right angles to the associated structure or to extend at an acute angle with respect to the associated structure, whilst said protrusions taper inwardly and upwardly towards the top of the member and inwardly from a mid point towards either side thereof.

12. A capital for, in use, facilitating jointing between the upper end of a column and a rail in a building structure, said capital including a lower portion having a passage therein adapted, in use, to receive the upper end of said column, and an upper portion having on at least one pair of opposed sides thereof a pair of protrusions adapted, in use, to receive on the undersides thereof opposed inwardly directed flanges of an associated rail which is received over the upper portion of the capital and wherein the passage in the lower portion of said capital tapers inwardly and upwardly to, in use, receive the upper end of the column in press fitting engagement therein.

13. A capital for, in use, facilitating jointing between the upper end of a column and an upper hand rail on a balustrading system, said capital including a lower portion having a passage therein adapted, in use, to receive the upper end of said column, and an upper portion having on at least one pair of opposed sides thereof a pair of protrusions adapted, in use, to receive on the undersides thereof opposed inwardly directed flanges of an associated hand rail which is received over the upper portion of the capital and wherein the passage in the lower portion of said capital tapers inwardly and upwardly to, in use, receive the upper end of the column in press fitting engagement therewith.

* * * * *